Nov. 1, 1955  F. C. WITT  2,722,470
DEPTH SOUNDERS
Filed Dec. 14, 1950  4 Sheets-Sheet 1

INVENTOR.
FRANCISCO C. WITT
BY
James B. Boyer
HIS ATTORNEY

Nov. 1, 1955  F. C. WITT  2,722,470
DEPTH SOUNDERS
Filed Dec. 14, 1950  4 Sheets-Sheet 2
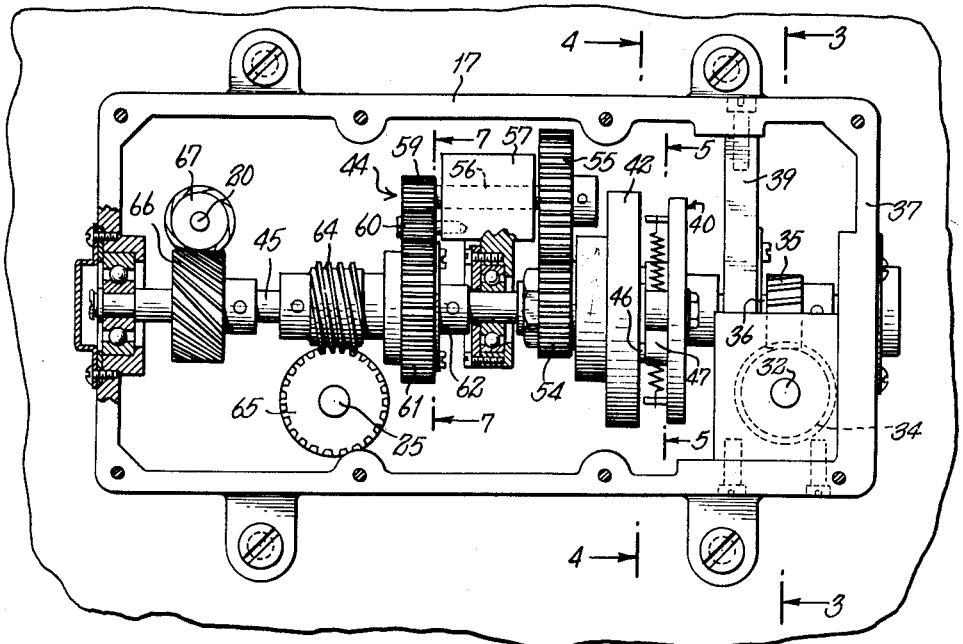
Fig. 2.
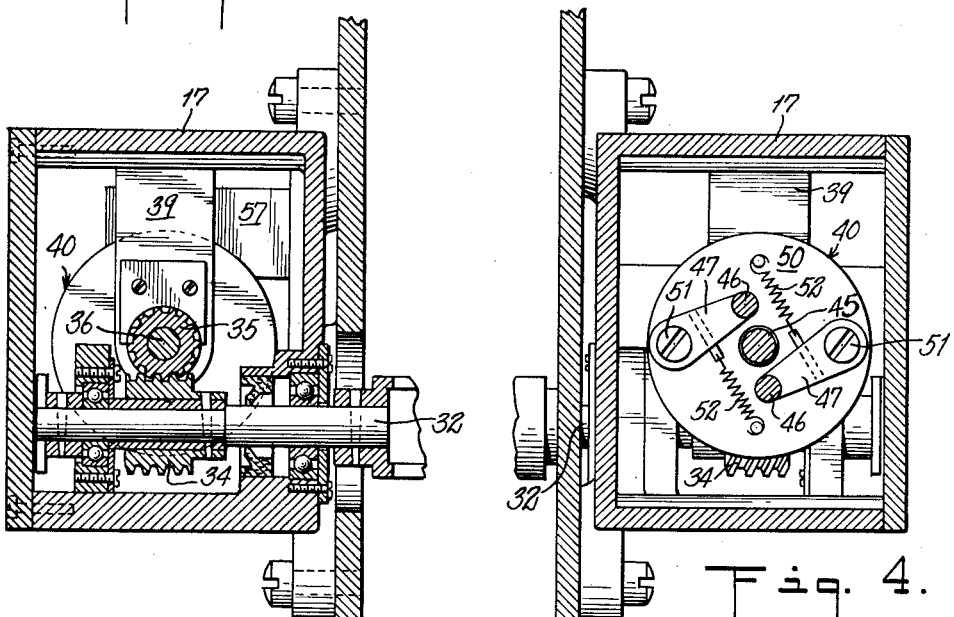
Fig. 3.
Fig. 4.
INVENTOR.
FRANCISCO C. WITT
BY
James B Boyer
HIS ATTORNEY Nov. 1, 1955

F. C. WITT 2,722,470

DEPTH SOUNDERS

Filed Dec. 14, 1950

INVENTOR.
FRANCISCO C. WITT
BY James B Boyer
HIS ATTORNEY

Nov. 1, 1955  F. C. WITT  2,722,470
DEPTH SOUNDERS

Filed Dec. 14, 1950  4 Sheets-Sheet 4

INVENTOR.
FRANCISCO C. WITT
BY James B. Boyer
HIS ATTORNEY

United States Patent Office 2,722,470
Patented Nov. 1, 1955

2,722,470

DEPTH SOUNDERS

Francisco C. Witt, Brooklyn, N. Y., assignor to National-Simplex-Bludworth, Inc., New York, N. Y., a corporation of Delaware Application December 14, 1950, Serial No. 200,718

8 Claims. (Cl. 346—65)

This invention relates to devices for transmitting torque at different speed ratios, and particularly to means for driving recording apparatus positively at different speeds in the same direction of rotation for different ranges of indication.

The invention has been shown as embodied in marine echo depth sounding equipment, in which a continuous permanent record may be made of depth sounding during travel of the vessel.

The present disclosure represents an improvement on the speed-changing equipment incorporated in such echo depth sounding equipment in the prior art.

The use of speed changing equipment in depth sounder recorders is desirable when operating over waters the depths of which may be of substantially different orders of magnitude.

For example, in deep waters, soundings may be taken and recorded in fathoms, while in shoal waters, where the depth may be changing by a larger percentage between successive soundings, it is desirable to record the depth in feet.

The depth recording or indicating equipment shows these variations instantaneously, or records them in permanent form, or both, as a result of measurements made on a pulse echo.

To enable the instrument to function over both the foot and fathom ranges, it is necessary to provide two different speeds to change the time bases over which the recording or indicating means operate.

In prior depth sounding devices, means for accomplishing such changes have utilized a planetary transmission with a clutch arrangement, a gear shifting arrangement, or other equivalent mechanism. These were subject to the common disadvantages of such devices in requiring the taking up of the bands or adjusting for wear, and in the necessity for frequent renewal of worn gears. Sufficient slippage frequently arose to make the soundings inaccurate.

The present device provides a positive drive, in which slippage is eliminated, and in which there is no clashing or wear-producing engagement of gears during speed changes. It also eliminates the delay in time required by the motor and gears of prior devices in coming to rest before beginning to function at a new speed ratio, since the change of ratio is substantially instantaneous. It accomplishes its shift in speed entirely thru changes in the direction of rotation of the motor means from which power is supplied, while still driving the output shaft in the same direction, and with the gear train engaged at all times.

This mechanism is also applicable to other equipment, such as computing devices and the like, where the advantages of a positive dual speed drive are required, with a simple method of selecting the range of speed desired.

It is thus an object of the present invention to provide a novel form of positive drive dual speed gear change box.

It is a further object to provide such a speed change mechanism in which the slippage of prior clutch mechanisms due to wear is eliminated.

Another object is the elimination of the necessity for frequent maintenance and the tightening of bands required on planetary type transmission used in the prior art.

Still another object is to eliminate gear shifting and consequent "clashing" while moving from one speed range to another.

Yet another object is to increase the life and reduce the replacement of worn gears.

A further object is to reduce gear tooth strain by passing from one speed range to another without decelerating the gears to zero speed in one direction before accelerating to maximum in the opposite direction.

It is a still further object to provide such speed change mechanism in a form which may be extended to include a plurality of speed ranges.

Another object is to eliminate entirely the necessity for levers or control members entering the gear box, with the attendant oil sealing difficulties.

These and other objects will be apparent to those skilled in the art from the following description and from the drawings, in which:

Fig. 2 is a side elevation of the gear train unit incorporating the invention, rotated counterclockwise 90° for ease in illustration, taken as indicated by line 2—2 of Fig. 1;

Fig. 3 is a sectional view taken as indicated by line 3—3 of Fig. 2;

Fig. 4 is a sectional view taken as indicated by line 4—4 in Fig. 2;

Figure 1:
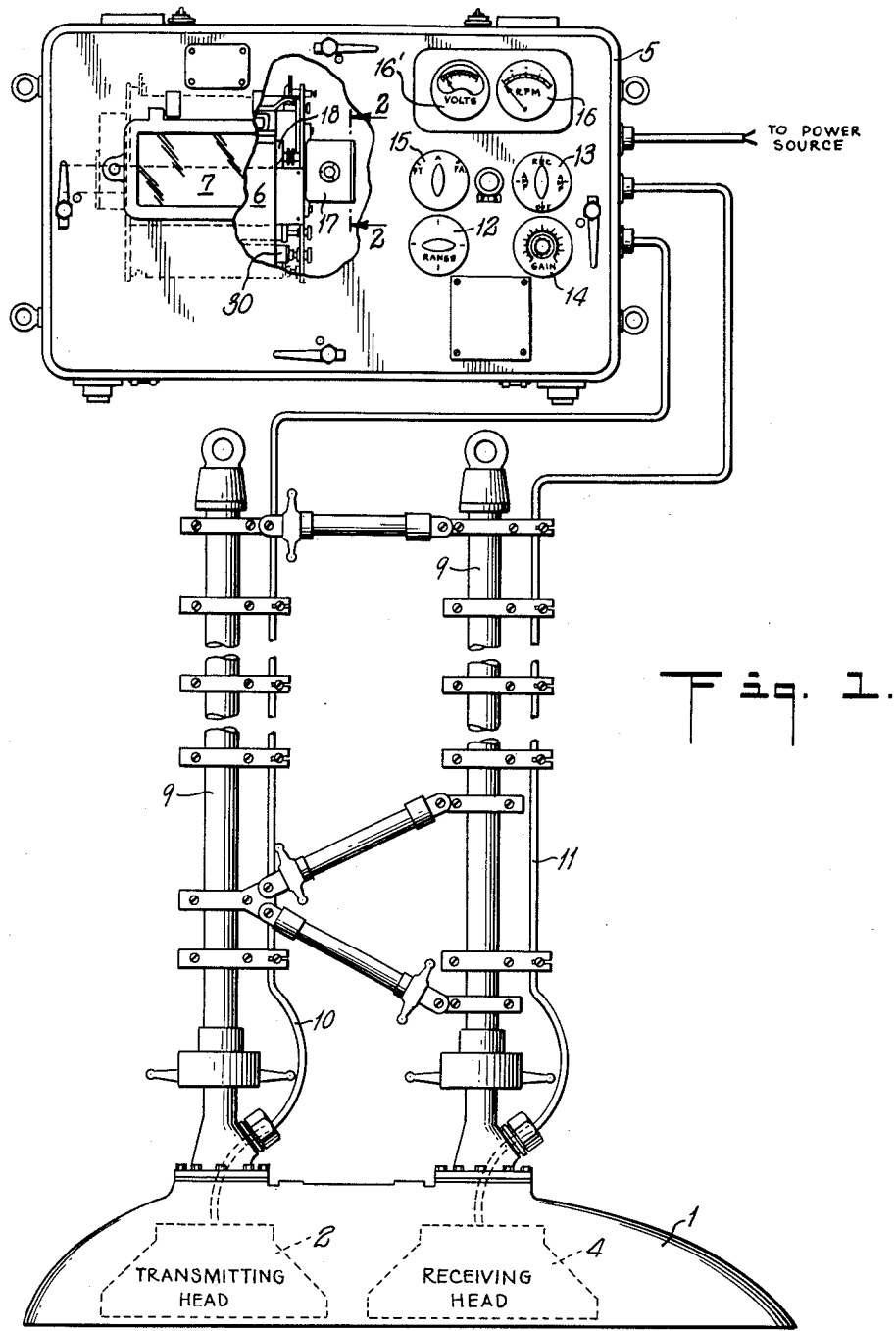
Fig. 1 is a schematic view showing the invention incorporated in a depth sounder and recorder of improved design.

It is understood that the embodiments shown in the drawings are illustrative only of the principles of the invention, and that these principles may be incorporated in other equipments and applied to other uses. Any such other uses and embodiments are deemed to come within the scope of the claims covering this invention.

Returning now to the drawings, I have shown schematically in Fig. 1 a typical marine depth sounder incorporating the invention. The device includes a housing 1 containing transmitting and receiving heads 2 and 4, respectively, which may be of piezo-electric or magnetostrictive construction. The transmitting head 2 is supplied with an electrical pulse from a suitable circuit, not forming part of this invention, enclosed within the instrument case 5, commonly carried on the deck or bridge of the vessel. The transmitting head 2 converts the electrical pulse into a sonic or supersonic compression wave or pulse which is projected into the water with which the housing 1 is in contact. A frequency of 14.7 kilocycles has been found desirable in a particular embodiment, but a wide choice of frequencies is possible. The compression wave is reflected from impedance discontinuities such as that between the water and the sea bottom back to the receiving head 4. It is there converted into an electrical impulse and conducted to the instrument case 5, where it is compared with the original pulse by suitable circuits. An indication of the depth is obtained by measuring the length of time required for the transmission and return of the pulse. The instrument case 5 houses equipment for recording these measured values in permanent form on suitably calibrated graph paper 6, seen behind a window 7.

In the embodiment shown in Fig. 1, the transmitting and receiving heads 2 and 4 are mounted in a housing 1 which is suspended below the surface of the water by suitable support pipes 9. Pipes 9 also carry the connecting leads 10 and 11 by means of which electrical connection is made from the transmitting and receiving heads 2 and 4 to the equipment within instrument case 5.

The support pipes 9 may be adjusted to maintain the housing 1 at the proper depth below the surface of the water. It will, of course, be obvious that the transmitting and receiving heads may be mounted in other ways, as, for example, on the keel of the vessel, or in the hull itself.

The instrument case 5 carries an adjusting knob 12 which controls the range over which the recording is effected, off-on switch knob 13, and a gain control knob 14 which changes the sensitivity of the device. A control knob 15 is provided to switch operations from feet to fathoms in the recording range. The speed of the motor drive is shown on a conventional meter 16, which may be of either a direct reading or a vibrating reed type. An accurate indication of this value is necessary, since upon it depends the accuracy of the measuring functions of the instrument. This meter is used also in adjusting the motor speed to compensate for variations in the temperature and salinity of the water, which affect its density, and, therefore, the velocity of the compression wave. Voltmeter 16' shows the supply voltage.

The housing 17, shown within instrument case 5, contains the speed change mechanism and gear train with which the present invention is particularly concerned.

A continuous marginal record of the range selected by the operation of control knob 15 is made on the chart paper 6 thru recording fingers, indicated generally as 13', and operable in a fashion similar to that explained hereafter in connection with the depth recording.

The gear train enclosed within housing 17 drives the helix-carrying cylinder or drum 18, a keying commutator which controls the pulse rate, an auiliary keying cam which limits the pulse rate to a desired relation to the speed of rotation of the cylinder, the three phasing cams, and the gear train which traverses the chart paper.

The main output shaft 20 drives the drum 18, which may be mounted directly thereon, and around which is disposed a spiral wire helix 21. The drum and helix are grounded, and good contact is made therewith by the paper 6, which is treated to be electrically conducting. When an echo signal is received, the pulse creates an arc discharge between the printer blade 22 and that portion of the paper which overlies the segment of the helix nearest the blade at that instant. A permanent record of the depth at that moment is burned into the paper by this arc. Main output shaft 20 also carries a keying commutator 24 which initiates the keying pulses.

The auxiliary output shaft 25 carries the auxiliary keying cam 26 which limits the number of pulses produced. It also carries three phase cams 27, 28 and 29 and their associated switches. The operative range of the instrument may be manually selected thru these cams by means of knob 12 when operating with the control knob 15 in either feet or fathoms position. The range selected is indicated on the chart by the recording fingers 13'. The auxiliary shaft 25 also drives the graph paper traversing roller 30, and a takeup roller 33 on which the chart paper is wound, thru a gear train indicated generally as 31. The power delivered to the main output shaft 20 and the auxiliary output shaft 25 is obtained thru the gearing enclosed within housing 17. Power is supplied to this gearing thru a first drive shaft 32 from suitable motor means, not shown in the figures. The speed of the motor should be constant, but adjustable in value thru conventional means to compensate for factors such as changing water temperature or salinity which affect the rate of propagation of the compression waves.

These parts of the instrument have been described to show their relation to the gear transmission mechanism with which the invention is particularly concerned.

From the motor, not seen in the figures, power is delivered to the transmission housing 17 thru a first drive shaft 32, on which is mounted a helical gear 34. Helical gear 34 engages a corresponding driven helical gear 35 mounted on an input drive shaft 36 which is journaled in suitable bearings disposed in the end 37 of housing 17 and in an intermediate supporting arm 39. On the end of shaft 36 directly inwardly from the end 37 of housing 17 is disposed a driving collar assembly 40 which effects a transfer of power, thru either a driven direct drive collar 41, or thru the driven reduced speed drive collar 42 and a reduction gear train indicated generally as 44, to second drive shaft 45. A bore 43 formed thru assembly 40 is adapted to receive the second drive shaft 45 in a freely rotatable manner to assist in maintaining alignment.

The driven direct drive collar 41 which is suitably pinned to shaft 45 to fix the collar in position thereon both axially and rotationally, is engaged when the soundings are to be indicated on the "foot" scale, while the driven reduced speed drive collar 42 is utilized when indicating on the "fathom" scale.

Reduced speed drive

Figure 9:
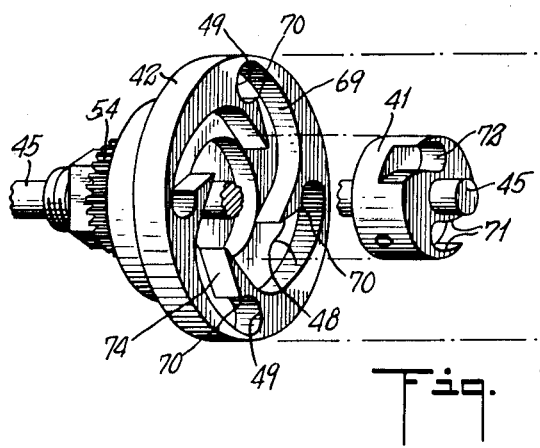
Fig. 9 is a schematic exploded view showing the parts forming the speed change mechanism of the invention.
Figure 9:
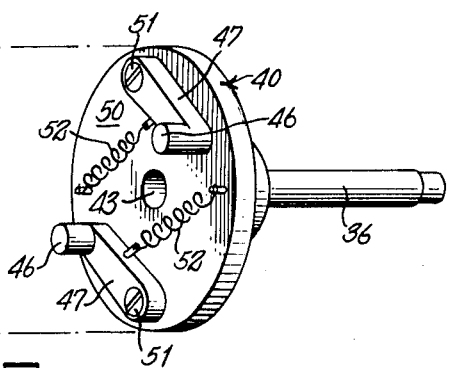
Figure 10:
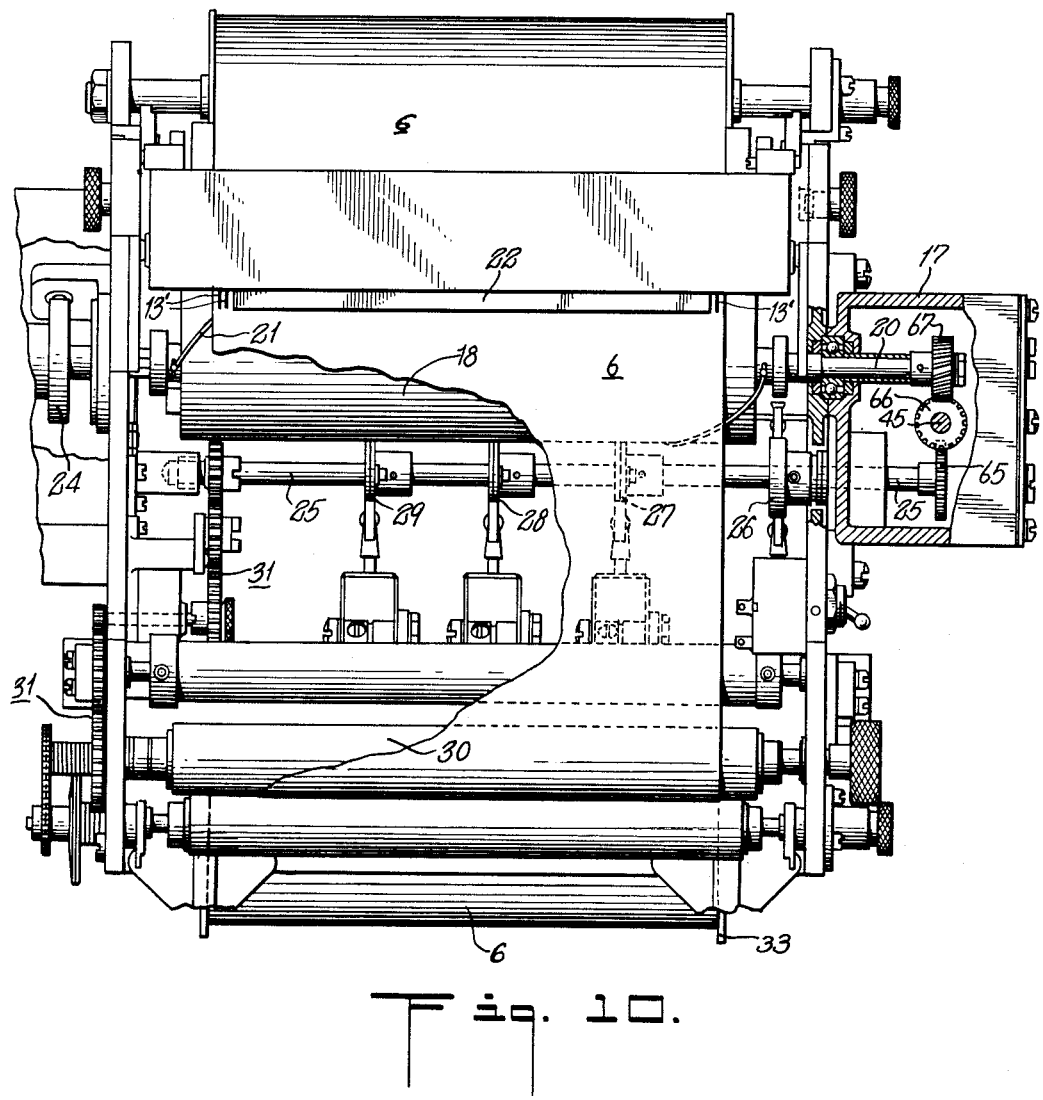
Fig. 10 is an elevational view showing other details of the associated mechanism.

When the driving motor is turning in such a direction that input drive shaft 36 rotates counterclockwise as viewed in the direction indicated by line 3—3 of Fig. 2, drive pins 46 associated with the input drive shaft 36 engage drive seats 49 associated with a first plurality of guide grooves 48 formed in the driven reduced speed collar 42. Drive pins 46 are formed integrally with drive pawls 47 and extend therefrom parallel to first drive shaft 36. The drive pawls 47 are mounted, as shown in Fig. 9, on drive disk 50 of the driving collar assembly by means of mounting studs 51 disposed near the periphery of drive disk 50. Pawls 47 are free to pivot on mounting studs 51 about axes parallel to the shaft 36. Springs 52 are provided to urge the pawls toward the center of the driving disk 50. These springs lock the drive pins 46 resiliently in position in drive seats 49 when no driving torque is applied, and assist in returning them to a central position when the direction of drive is reversed.

Figure 5:
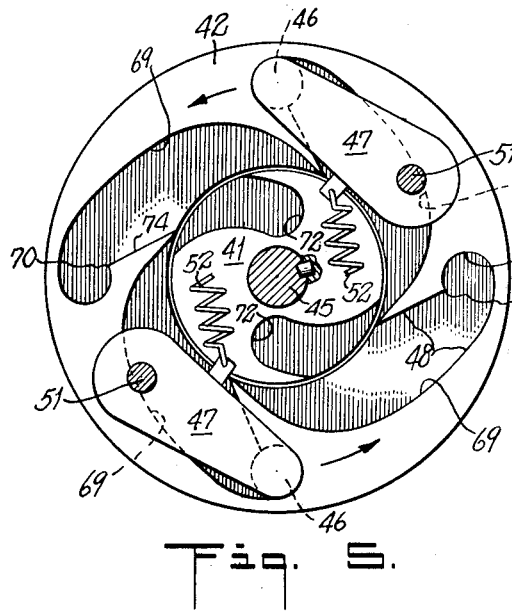
Fig. 5 is a schematic view, partially in section, taken as indicated by line 5—5 of Fig. 2, showing one operating position of the speed changing device of the invention.
Figure 6:
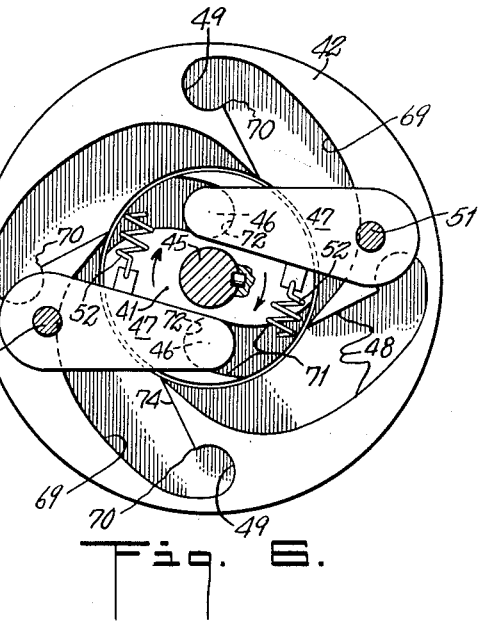
Fig. 6 is a schematic view similar to Fig. 5, showing another operating position of the speed changing device of the invention.
Figure 7:
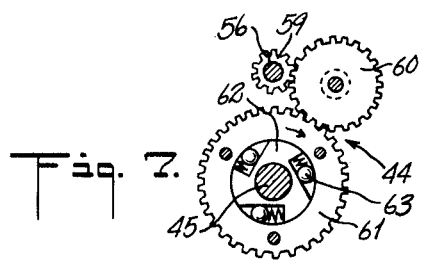
Fig. 7 is a sectional view taken along line 7—7 of Fig. 2.
Figure 8:
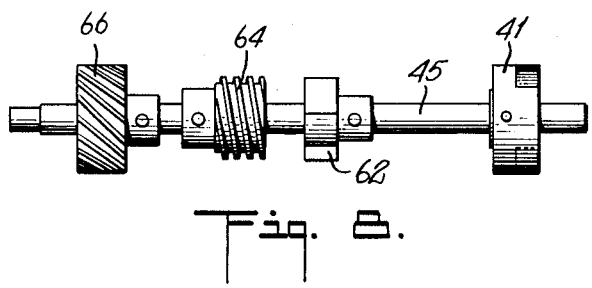
Fig. 8 is a schematic view showing the second drive shaft assembly removed from its normal position as shown in Fig. 2.

The driving torque transmitted by drive pins 46 to the driven reduced speed drive collar 42 in the direction, indicated by the arrows in Fig. 5, is passed thru the reduction gear 44 indicated generally at 44 to the second drive shaft 45. It is preferable that the collar and pins be formed of relatively hard steel. In a particular embodiment, the gear train 44 included a drive pinion 54 fixed to collar 42, a driven gear 55 mounted on a pinion shaft 56 journaled in a support arm 57 and having formed on its opposite end a pinion 59, an idler gear 60, and an over-running clutch drive gear 61 rotatable about a conventional over-running driven member 62 fixed on the drive shaft 45, and to which driving force may be communicated by the spring-positioned torque-transmitting members 63, second drive shaft 45 is thus compelled to rotate in a clockwise direction as viewed from 3—3 in Fig. 2. The torque thus transmitted is passed on to the recording instruments described briefly above by means of a helical driving gear 64, which drives the auxiliary output shaft 25 thru driven helical gear 65 secured thereto, and by a helical driving gear 66 which meshes with a driven gear 67 secured to the main output shaft 20.

This arrangement is used when a reduced speed of rotation of drum 19 is desired in connection with soundings in deeper waters, where indications in fathoms are satisfactory.

Direct drive

When the vessel is operating in shoal waters, and the indications are to be recorded on the foot scale, more rapid rotation of the drum 19 is required, which is obtained by reversing the direction of rotation of input drive shaft 32. The first drive shaft 36 and driving collar assembly 40 are then rotated in a clockwise direction as viewed from 3—3 in Fig. 2, carrying the pawls 47 and drive pins 46 with them. As the reversed, or clockwise, rotation begins, the inertia of the reduced speed drive collar and associated parts is sufficient to carry the pins over the locking points 70, after which the tension in springs 52 and the curvature of the outer walls 69 of the guide grooves 48 cooperate to force the drive pins 46 toward the center of the collar 42. Prior to such reversal, the pins 46 are locked resiliently in the seats 49 by springs 52. The pins 46 must rise over the locking points 70 against the resistance of springs 52 to become released from this engagement on such reversal of drive.

As the pins 46 slide along the arcuate outer guide wall grooves 69, they approach the direct drive collar 41, which, together with second drive shaft 45 on which it is mounted, is rotatably journaled within the reduced speed drive collar 42, and is grooved at 71 to receive the drive pins. During the movement, the springs 52 and the continually decreasing radial separation of the guide groove walls 69 from the center of collar 42 cooperate to direct pins 46 toward the direct drive grooves 71, along which they will travel until they come to rest in direct drive seats 72 formed terminally thereof.

If the pins first engages a portion of the periphery of the driven direct drive collar 41, they will be held in engagement therewith by springs 52 until the relative rotation of the parts brings the grooves 71 into position, so that the pins may enter and engage the seats 72 therein.

The applied torque is then transmitted to the second drive shaft 45 by the direct drive collar which is suitably pinned thereto. It should be noted in the exploded view of Fig. 9 that the direct drive collar assembly 42 has been shown as displaced axially of the shaft 45, about which it is rotatably journaled, for ease of illustration.

The second drive shaft 45 next transmits this torque thru the helical gears 64 and 65, to the auxiliary output shaft 25, and thru helical gears 66 and 67 to the main output shaft 20.

During this operation, the over-running drive gear 61 is in its free-running position, so that no torque is fed back thru the gear train 44. It will be observed that in the direct drive position, the direction of rotation of second drive shaft 45 and of shafts 20 and 25 are the same as were obtained with the reduced speed position.

If the motor drive is again reversed, the pins 46 will be driven out of the grooves in the driven direct drive collar 41, and will be driven up the inclined entry walls 74 of the guide grooves 48 in the driven reduced speed drive collar, passing over the locking points 70 to nest in the drive seats 49.

It will be apparent that by driving the output shafts in the same direction for both foot and fathom ranges, strains and wear on the gear trains are reduced, since it is not necessary to bring the output portions of the mechanism to a standstill in shifting ranges.

Those skilled in the art will recognize that the principles of the structure described may have application to many other devices, of which power transmission and computers are merely illustrative, in which it is desirable to effect a positive drive in one direction at a plurality of speeds. It will also be recognized that the number of speeds possible is not limited to two, but that additional drive collars and reduced or increased speed gear trains and suitable clutches might be superimposed on the illustrated structure.

What I claim as new, is:

1. In a device for transmitting rotational movement from input means to unidirectionally operative output means, means for selecting a desired one of a plurality of speed ratios between said input and output means, comprising an input drive shaft, means for effecting a positive direct driving connection between said input drive shaft and output means when said input drive shaft is driven in one direction, comprising a pair of arms pivotally mounted for movement about axes parallel to said input drive shaft and having non-pivoted ends projecting parallel to said axes from said arms; means, connected directly to said output means, having arcuately curved slots to receive said projecting ends in driving engagement when said input means are rotated in one direction; means for effecting a positive reduced speed driving connection between said input drive shaft and said output means operative to drive said output means in the same direction of rotation as that produced when said output means are driven by said direct driving connection, comprising means having arcuately grooved slots adapted to be engaged by said projecting non-pivoted ends; and means for controlling the direction of rotation of said input drive shaft.

2. In a device for transmitting rotational movement from input means to unidirectionally operative output means, means for selecting a desired one of a plurality of speed ratios between said input and output means, comprising an input drive shaft, a second drive shaft, means for effecting a positive direct driving connection between said input drive shaft and said second drive shaft when said input drive shaft is driven in one direction, comprising a pair of arms pivotally mounted for movement about axes parallel to said input drive shaft and having non-pivoted ends projecting parallel to said axes from said arms; means, connected directly to said output means, having arcuately curved slots to receive said projecting ends in driving engagement when said input means are rotated in one direction; means for effecting a positive reduced speed driving connection between said input drive shaft and said second drive shaft operable to drive said second drive shaft in the same direction of rotation as that produced when said second drive shaft is driven by said direct driving connection, comprising means having arcuately grooved slots adapted to be engaged by said projecting non-pivoted ends; means for disconnecting said positive reduced speed driving connection from said second drive shaft when said direct driving connection is effective; and means for controlling the direction of rotation of said input drive shaft.

3. In a device for transmitting torque positively and unidirectionally to output means at different rates of rotation relative to that of input means, means for selecting a desired one of such rates of rotation by controlling the direction of rotation of such input means, comprising first drive shaft; a drive collar assembly secured to said shaft and having a drive disk, drive pawls secured pivotally to said drive disk near the periphery thereof, resilient means for urging said drive pawls centrally of said drive disk, and drive pins extending from said drive pawls in a direction parallel to the axis of rotation of said drive collar assembly; a second drive shaft, a driven direct drive collar, a driven reduced speed drive collar disposed about, and freely rotatable relative to, said driven direct drive collar; a first plurality of guide grooves formed in said driven reduced speed drive collar, a first plurality of seats, each terminally defining one of said first plurality of guide grooves and adapted to be engaged by said drive pins when said drive collar assembly is rotated in one direction; a second plurality of guide grooves formed in said driven direct drive collar; a second plurality of seats, each terminally defining one of said second plurality of guide grooves and adapted to be engaged by said drive pins when said drive collar assembly is rotated in the direction opposite to that in which said first plurality of seats is engaged by said drive pins, a reduction gear train associated with said driven reduced speed drive collar; an overrunning clutch engaged by said reduction gear train and disposed about and adapted to rotate said second drive shaft only when said drive pins are engaged with said first plurality of seats, and effective to disconnect said shaft from said reduction gear train when said drive pins are engaged with said second plurality of seats, and output means associated with said second drive shaft.

4. In a transmission device, the combination of positively engaged means for imparting unidirectional torque to driven means at different speeds which comprises a housing, a first drive shaft, rotatably mounted therein, an input driving collar assembly mounted on said first drive shaft, pawls mounted pivotally on said assembly about axes eccentric to the rotational axis of said assembly, drive pins extending parallel to the axis of rotation of said assembly from said pawls, and resilient means for urging said pins toward the axis of rotation of said assembly; a reduced speed drive collar, a central bore formed thru said collar; curved grooves formed in said collar, originating at said central bore and terminating in reduced speed driving seats near the periphery of said collar, and adapted to receive and be engaged by said drive pins in one direction of rotation of said input driving collar assembly; a direct drive collar rotatably disposed within said central bore; curved grooves, originating at said central bore and terminating in direct drive seats near the center thereof, formed in said direct drive collar, and adapted to receive and be engaged by said drive pins in the direction of rotation of said drive collar assembly opposite to that in which said drive pins engage said reduced speed driving seats; a second drive shaft secured to said direct drive collar, and a drive pinion fixed to said reduced speed drive collar and journaled therewith for free rotation about said second drive shaft; a reduction gear train actuatable by said drive pinion, comprising a pinion shaft rotatably journaled in said housing, a driven gear mounted on one end of said pinion shaft and meshing with said drive pinion, a pinion mounted on the other end of said pinion shaft, an idler gear mounted for rotation in said housing and meshing with said pinion, an over-running clutch gear journaled about said second drive shaft and meshing with said idler gear, and an over-running clutch disposed within said over-running clutch gear and about said second drive shaft and arranged to transmit torque therebetween when said reduction gear train is driven by said drive pinion and to transmit no torque between said shaft and said reduction gear train when torque is transmitted thru said direct drive collar.

5. A dual range distance measurement apparatus comprising means for indicating measured distances; power input means reversely rotatable at a predetermined speed; unidirectionally operative dual speed output means in driving connection with said indicating means, remotely range selection means for selecting the direction of rotation of said power input means and determining the rate of proportionality between the speed of said power input means and said indicating means; and a positive direct driving mechanism instantaneously operable to drive said unidirectional output means at a selected speed controlled by said remotely operated mean; said driving mechanism including a single rotation transmitting member operatively connected to the power input means, a first coupling member connected to the output means, a second coupling member, and gearing connecting said second coupling member to said output means, said rotation transmitting member being selectively and alternatively engageable with either of said coupling members to provide, at a first direction of rotation of said power input means, a direct driving connection through the first coupling member only of said driving mechanism at one selected speed and while the gearing is disengaged, and to provide a positive driving connection through said second coupling member and said gearing only of said driving mechanism while disengaging the first coupling member of said mechanism, for a different selected speed of said unidirectional output means.

6. A dual range distance measurement apparatus comprising range selecting means; reversely rotatable power input means rotating at a predetermined constant speed; mechanical connection means selecting the ratio of output speed to the speed of the power input means under control of the range selection means; means for indicating measured distances connected to the output of the mechanical connection means; a first rotation transmitting member; an overrunning clutch interconnected with a gear train to effect driving connection from said first rotation transmitting member to the output; a second rotation transmitting member directly connected to the output to rotate therewith; and a single drive means positively coupled to said power input means and selectively positively engageable with only one or the other of said rotation transmitting members in accordance with one or the other direction of rotation of said power input means, said other rotation transmitting member being disengaged and out of driving engagement with said single drive means, so that upon rotation in one direction, the first of said rotation transmitting members will be engaged with said clutch and gear train, and upon rotation in the other direction, positive driving engagement with the other of said rotation transmitting members will be effected.

7. In a device for distance measurement by the echo measurement method, range selecting means, reversely rotatable power input means rotating at a predetermined, constant speed, mechanical connection means selecting the ratio of output speed to the speed of the power input means under control of the range selection means, and means for indicating measured distances connected to the output of the mechanical connection means; a first rotation transmitting member comprising a rotatable body formed with a substantially helical groove therein in driving engagement with the output; a second rotation transmitting member comprising a rotatable body formed with a substantially helical groove therein directly connected to the output to rotate therewith; and a single drive means having a movable engagement member positively coupled to said power input means and selectively positively engageable with the groove of only one or the other of said rotatable bodies of the rotation transmitting members in accordance with one or the other direction of rotation, so that upon rotation in one direction, one of said rotation transmitting members will be engaged, and upon rotation in the other direction, positive driving engagement with the other of said rotation transmitting members will be effected.

8. A positive drive for selecting the connection of an input shaft with a pair of output means in accordance with the direction of rotation of said input shaft, comprising a first rotation transmitting member connected to the first output means and formed with a substantially helical groove therein; a second rotation transmitting member connected to another output means and formed with a substantially helical groove therein, and a single drive means positively coupled to the input shaft and including a movable engagement member selectively positively engageable with the groove of one, or the other rotation and transmitting member in accordance with the direction of rotation of the input shaft.

(References on following page)

References Cited in the file of this patent

UNITED STATES PATENTS

| | | |
|---|---|---|
| 736,564 | Stollenwerk | Aug. 18, 1903 |
| 744,428 | Stollenwerk | Nov. 17, 1903 |
| 2,038,082 | Lazich | Apr. 21, 1936 |
| 2,047,174 | Baumgartner | July 14, 1936 |
| 2,198,171 | Mackenzie | Apr. 23, 1940 |
| 2,273,626 | Connell | Feb. 17, 1942 |
| 2,309,956 | Hughes | Feb. 2, 1943 |
| 2,429,236 | Potter | Oct. 21, 1947 |
| 2,510,575 | Hathaway | June 6, 1950 |